Patented May 9, 1944

2,348,328

UNITED STATES PATENT OFFICE 2,348,328

PROCESS OF AND APPARATUS FOR TREATING SULPHURIC ACID CONTAINING DISSOLVED NITRO BODIES

Fred Francis Chapman, Wilmington, and Ralph Francis Peterson, Bellefonte, Del., and Clifford Akeley Woodbury, Media, Pa., assignors to E. I. du Pont de Nemours & Company, Wilmington, Del., a corporation of Delaware Application January 10, 1941, Serial No. 373,956

4 Claims. (Cl. 23—306)

This invention relates to the concentration and purification of residual acid.

Certain processes known to the prior art, although adequate in other respects, have proved to be completely unsatisfactory for the removal of aromatic nitrobodies from the residual acid.

The object of this invention is an improved process for the concentration and purification of sulphuric acid containing organic impurities such as nitrobodies or the like, particularly those of aromatic origin. A further object is an improved apparatus for concentrating and purifying said acid. Other objects will be apparent from the following description of the invention.

We have found that the foregoing objects are accomplished when sulphuric acid, containing organic matters such as nitrobodies from the manufacture of explosives or the like, is caused to flow in a condition of high surface exposure, as in a thin layer or film down over the inner surface of one or more substantially vertical externally heated tubes, under reduced pressure, and continuously from said tubes down through at least one barometric leg which is preferably heat-insulated and not cooled, into a seal tank, and then permitted to flow through heated tubes preferably inclined upward, and finally flow into a retention tank which is also preferably heat-insulated. Thus the acid is concentrated quickly in the falling film vertical tubes, and the nitrobody subsequently destroyed in the prolonged heating treatment.

Figure 1:
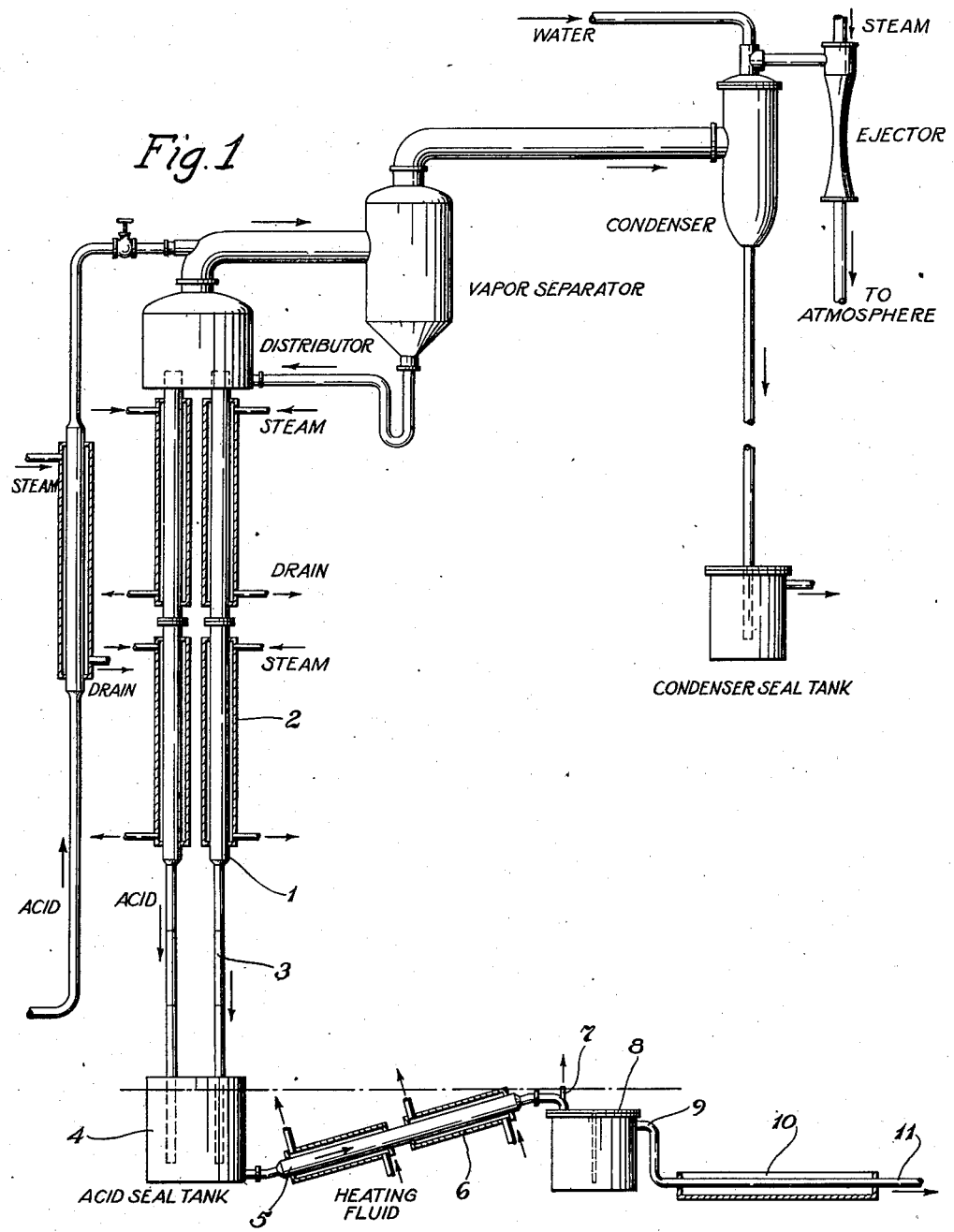
Figure 2:
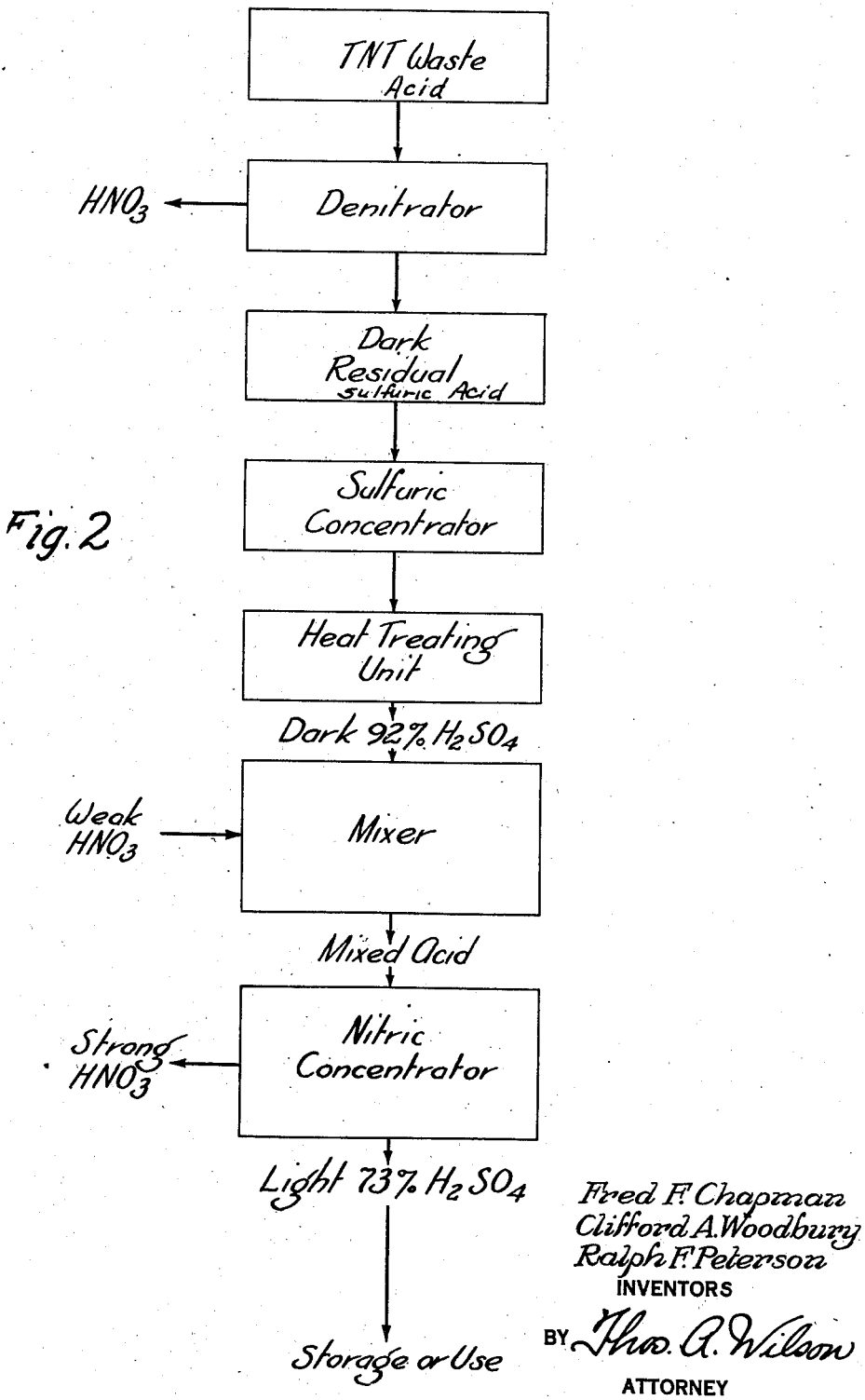

In the drawings, Fig. 1 illustrates apparatus for carrying out the hereindescribed invention and Fig. 2 illustrates the process thereof.

The details of the process and apparatus of the invention may be more readily understood from the following description of the preferred embodiment thereof wherein reference is made to the various parts of the Fig. 1.

The residual acid containing nitrobody is concentrated rapidly as a falling film in the vertical tubes 1, provided with heating jackets 2 as shown in Fig. 1. The concentrated acid leaves the bottom of the vertical tubes and passes downward through the barometric legs 3, suitably constructed of Duriron tubes. These barometric legs, which are preferably insulated and are not cooled, dip into the seal tank 4. This tank, like the leg, is also preferably heat-insulated to minimize heat losses. Accordingly, the acid therein may have a temperature in the neighborhood of 300° F. The level of the acid in the seal tank is maintained sufficiently high so that the barometric legs dip beneath the surface of the acid.

From the seal tank the hot acid is caused to flow by gravity through the upwardly inclined tubes 5. These are preferably Duriron tubes provided with jackets 6 through which hot oil or the like is circulated, preferably at a temperature from 500–525° F. This serves to heat the acid from about 300° F. to approximately 480° F. The size of the tubes is such that the time of passage of acid through them is preferably in the neighborhood of 30 minutes, permitting decomposition of the nitrobody. The tubes are inclined sufficiently to retain a full body of acid in them. However, the exit end of these heating tubes is kept at a level slightly lower than the top of the seal tank to prevent the overflow of liquid from the latter. The gas vent 7 is provided at the upper end of the purification tube. The acid from these heating tubes flows into the retention tank 8 of such size as to provide a further retention of the hot acid for approximately 45 minutes longer, in order to permit decomposition and/or carbonization of the nitrobody to go substantially to completion. Accordingly, this retention tank is heat-insulated and may be constructed of brick and lead-lined steel. The acid with nitrobody destroyed then leaves the retention tank through tube 9, passes through the cooler 10 and is sent out at 11 to storage or to any further conventional usage. Sometimes this acid is treated with oxidizing agents to oxidize the carbon to carbon dioxide. Nitric acid may be used for this purpose.

Other elements in the concentrating apparatus which are shown in the drawings and described by legend are the condenser, the vapor separator, and the distributor. These are conventional elements and need no explanation.

The foregoing description constitutes the preferred embodiment of our invention. However, we do not intend to be limited thereby. For instance, while the purifying apparatus and process is especially advantageous when employed with the falling film type of concentrator as described, it is nevertheless applicable also to any conventional type of concentrating apparatus or process, but particularly those processes wherein the acid is concentrated under vacuum, or by passing hot gases through the acid, especially in the event that the atmospheric boiling point of the acid is not reached.

One highly advantageous adaptation of the present invention may be understood by referring to the flow sheet shown in Figure II, wherein a process is described for concentrating nitric acid by means of the concentrated residual sulphuric acid which has been heat-treated according to our invention to destroy the nitrobody therein. The residual acid from the manufacture of trinitrotoluene, dinitrotoluene, or the like, is passed through a conventional denitrating means to recover the nitric acid therefrom, leaving what is known as dark residual acid containing a relatively high content of organic matter. This dark residual acid is passed through a sulphuric acid concentrating unit, for instance such as that described in the foregoing. The concentrated acid is heat-treated to effect further decomposition of organic matter. The resulting acid is a dark sulphuric acid having a concentration of approximately 92%. This dark concentrated acid is then mixed with weak nitric acid to form a concentrating mix. This concentrating mix is passed through a nitric acid concentrating unit from which strong nitric acid is recovered. The sulphuric acid issuing from the unit is light in color, substantially free from organic matter, and has a strength of approximately 70-73% sulphuric acid. It is then of satisfactory quality for use in other processes where dark acid of high organic content would be objectionable. For instance it may be sent to the light residual acid storage in a system wherein a battery of sulphuric acid concentrators is used in conjunction with a battery of nitric acid concentrators for the production of strong nitric acid.

Although we prefer to employ the heat-treating unit illustrated in Figure I for the purpose set forth in Figure II, it should be understood that it is an advance in the art to employ any heat-treating unit in such a process.

The process of the present invention is particularly advantageous in that it accomplishes satisfactorily the removal of nitrobodies which are aromatic in nature. These nitrobodies have not been removed successfully by certain processes of the prior art. It may be that the success of the present process in the removal of the same is due to the fact that nitrobodies of this type are particularly stable at high temperatures and require prolonged heating at elevated temperatures to bring about their decomposition.

The method and apparatus of this invention are particularly advantageous for plants engaged in the manufacture of munitions and other explosives, wherein the concentration of residual sulphuric acid is complicated by the presence of dissolved nitrobody or other organic material in the acid.

Although we prefer to operate with the purification tube inclined upwards, as described in the foregoing, it will be understood that this tube may be in any other suitable position. For instance, it may be arranged horizontally with a damming means or some similar arrangement for obtaining the prolonged heating described.

We intend to be limited only by the following patent claims.

We claim:

1. The process of treating the residual sulphuric acid containing nitrobodies or the like, which comprises passing said acid continuously in the form of a thin layer down and over the inner surface of a heated substantially vertical tube, and down through a heat-insulated barometric leg at the base of said tube into a heat-insulated seal tank, thereby maintaining said acid in said tank at approximately 300 F., flowing said acid from the region of the base of said seal tank upwardly through inclined tubes, heating the acid in said tubes from approximately 300° F. to approximately 480° F., the time of passage of said acid through said inclined tubes being approximately 30 minutes, flowing said acid into a heat-insulated retention tank and retaining the acid in said tank for approximately 45 minutes, to produce a concentrated sulphuric acid free from nitrobodies.

2. An apparatus for the concentration and purification of residual sulphuric acid containing dissolved nitrobodies or the like, which comprises in series, a condenser, a vapor separator, a distributor, at least one vertical heated falling film tube, at least one barometric leg at the foot of said tube, a seal tank at the foot of said leg, at least one heated purification tube inclined upwardly from the lower region of said seal tank, a gas vent in the upper region of said purification tube, and a heat-insulated retention tank, said apparatus elements being connected in sequence permitting passage of acid from one to the other.

3. An apparatus for the concentration and purification of residual sulphuric acid containing dissolved nitrobodies or the like, comprising an acid concentrating unit provided with means for maintaining a reduced pressure therein, and connected with said unit, a heat-insulated barometric leg dipping into a heat-insulated seal tank, an upwardly inclined purification tube provided with heating means, and a heat-insulated retention tank arranged to receive the flow of acid from the upper end of said purification tube, said apparatus elements being connected in sequence permitting gravity flow.

4. The process of treating residual sulphuric acid containing nitrobodies or the like, which comprises passing said acid continuously in the form of a thin layer down and over the inner surface of a heated substantially vertical tube and down through a barometric leg at the base of said tube into a seal tank, flowing the same through a heated tube and into a retention tank, at such rate and temperature that said acid is retained at a temperature from approximately 300° F. to 480° F. for approximately 75 minutes to produce a concentrated sulphuric acid free from nitrobodies.

FRED FRANCIS CHAPMAN.
RALPH FRANCIS PETERSON.
CLIFFORD A. WOODBURY.